INVENTORS
MAX E. TOBY &
DANIEL J. TOBY
BY
Gardner & Zimmerman
ATTORNEYS

June 17, 1958

M. E. TOBY ET AL 2,839,205

APPARATUS FOR TRANSFERRING ARTICLES

Filed Feb. 17, 1955

INVENTORS
MAX E. TOBY &
DANIEL J. TOBY
BY
Gardner & Zimmerman
ATTORNEYS

United States Patent Office 2,839,205
Patented June 17, 1958

2,839,205

APPARATUS FOR TRANSFERRING ARTICLES

Max E. Toby, San Francisco, and Daniel J. Toby, San Mateo, Calif., assignors to Package Enterprises, Inc., Oakland, Calif., a corporation of California Application February 17, 1955, Serial No. 488,832

8 Claims. (Cl. 214—2)

This invention relates to a method and mechanism for handling articles such as stacked cheese slices, and is more particularly directed towards such a method and mechanism for receiving a stack of such slices from a slicer or the like and conveying the same to a remotely positioned scale whereupon the slices are deposited on the scale platform for weighing. As will be hereinafter made more clear, although the method and apparatus was particularly designed for the unique problems involved in the handling of cheese slices, such method and apparatus is equally efficient in handling a single article or stacked slices of other products.

In our copending application Serial No. 250,370, filed October 8, 1951, now Patent No. 2,708,539, entitled Apparatus and Method of Receiving and Bagging Articles, and Serial No. 402,109, filed January 4, 1954, entitled Apparatus and Method for Receiving, Conveying, Weighing and Bagging Articles, apparatus and methods of the same general type to be disclosed in this application were set forth, as both of our prior applications, disclosed processes and mechanisms for handling articles, including stacks of meat slices or the like. However, it has been found that neither of these arrangements were particularly adequate for handling more tacky or sticky articles such as cheese slices. Extensive experimentation has shown that slices of cheese are not readily slidable along a supporting platform, and furthermore, such slices have a tendency to deposit a film on any stack support on which the stack may be placed, so that after a very short time, it is impossible to slide the stack from one supporting means to another. In fact, the adhesion of the cheese slices to a support platform or the like is so great that the machine or mechanism can actually become jammed if an effort is made to slide the stack therealong. Thus, the methods and apparatus provided in our prior applications which include a sliding of the transferred article from one supporting member to another are not adequate for the transferring of cheese slices or like products.

It is accordingly an object of the present invention to provide a method and apparatus for receiving articles such as a stack of cheese slices or the like from a slicer or other mechanism, and transfer such stack to a position remote from the receiving position for weighing or other operations.

Another object of the present invention is to provide a process and apparatus of the character described which is completely automatic in operation and which is arranged to transfer a stack of slices to a position remote from the loading or receiving station without imposing any lateral forces on the stack and without requiring any sliding of the stack along its supporting member or members.

A further object of our invention is to provide mechanism and a method of the above character in which the stack is positively removed from the conveying member even where the stack is composed of sticky or tacky articles such as cheese slices.

Yet another object of the invention is to provide an apparatus and method of the foregoing character which is designed to receive a stack from a slicer and gently deposit the same on a scale platform without any abrupt dropping of the stack thereon, whereby any excessive oscillation of the scale is eliminated.

A still further object of our invention is to provide apparatus as hereinabove set forth in which the stack supporting member is capable of movement in both horizontal and vertical directions, and which is extremely rapid in operation so as to not slow down the functioning of a high speed slicing machine.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and descriptions may be adopted within the scope of the invention as set forth in the claims.

Referring to said drawings.

Figure 1:
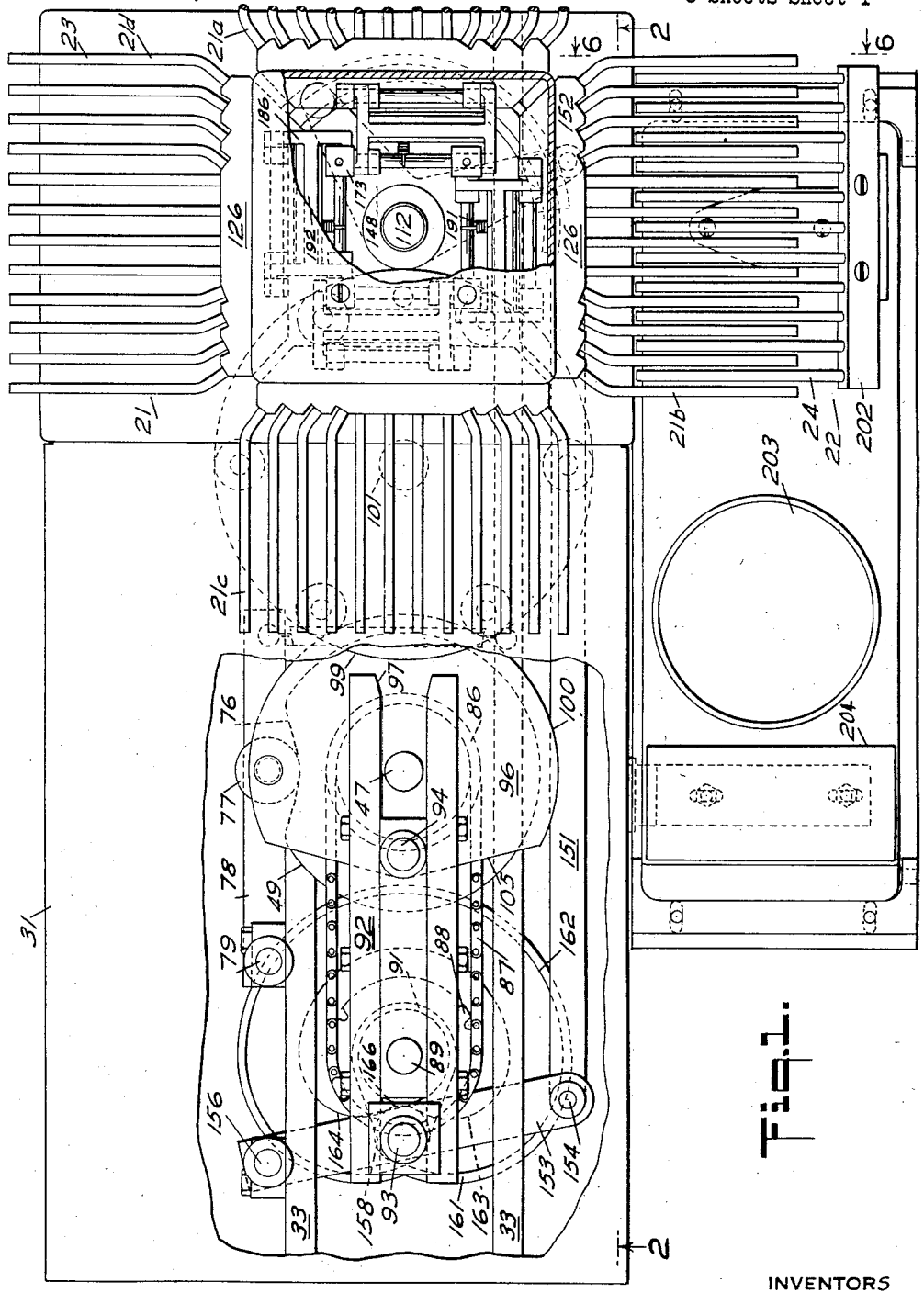
Figure 1 is a top plan view of the apparatus of the present invention.
Figure 2:
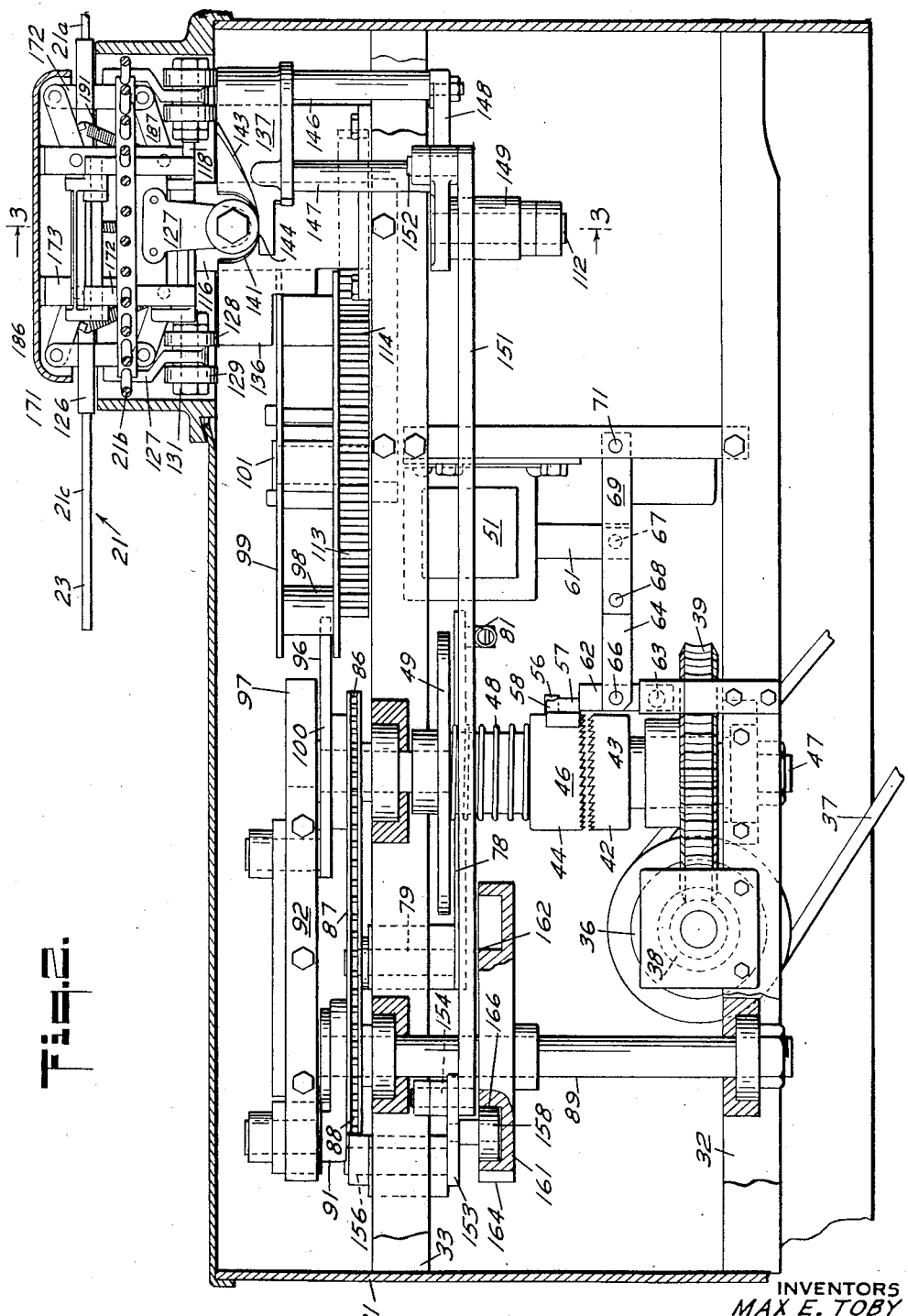
Figure 2 is a vertical sectional view taken substantially in the plane indicated by the line 2—2 of Figure 1.
Figure 3:
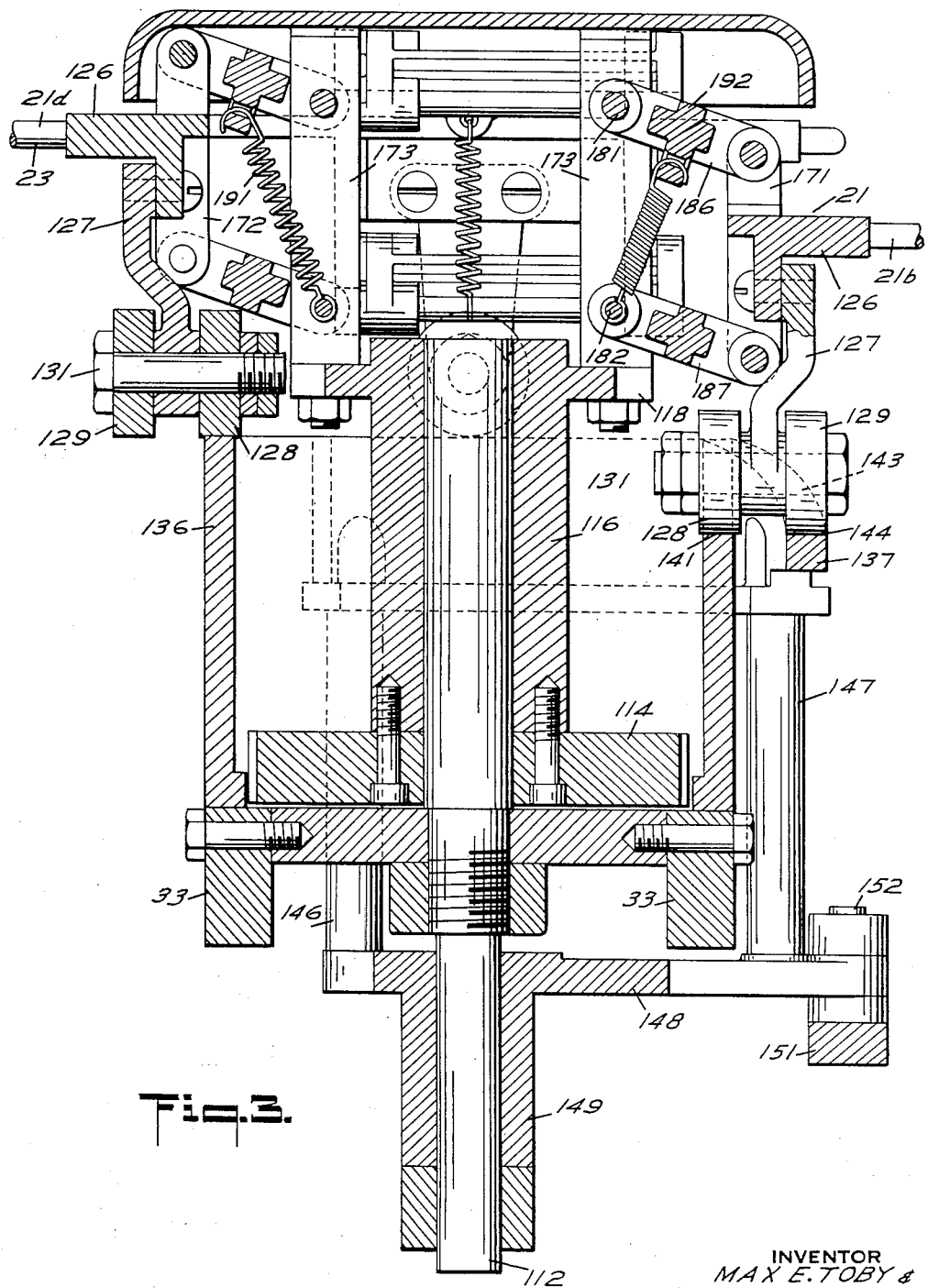
Figure 3 is a vertical cross-sectional view taken substantially in the plane indicated by the line 3—3 of Figure 2, and on an enlarged scale.

In broad terms, the method of the present invention, as adapted to be carried out by the apparatus disclosed in the foregoing drawings, comprises the reception of a stack of cheese slices or the like at a receiving station, the horizontal conveying of the stack to a remotely disposed second position overlying a scale platform, and the movement of the stack downwardly to be gently deposited on the scale platform. The entire process is arranged to be carried out automatically and is synchronized with the action of a slicing machine or other article-dispensing mechanism so that the transferring will occur at specified intervals during the slicing operation. Also, during the weighing of a stack, the apparatus is simultaneously receiving a new stack of slices so that there is no wasted motion or time lost to interfere with the normal operation of the slicer.

More particularly, the apparatus as disclosed in the accompanying drawings, includes a plurality of receiving platforms or grids 21, the respective platforms being designated by the numerals 21a, 21b, 21c and 21d, and each disposed substantially 90 degrees from the other. The respective platforms 21 are arranged to be sequentially positioned subjacent the discharge end of a slicer, and then intermittently moved from said receiving position to a horizontally remote position overlying a scale platform 22. Each of the platforms 21 is in the form of a grid and includes a plurality of substantially horizontal parallel spaced tines or supporting portions 23 on which the slices are deposited. Likewise, the scale platform on which the product or stack of articles is to be weighed is in the form of a complementary grid having a plurality of parallel spaced tines 24, and when the respective receiving grids 21 move to the weighing station, it will be noticed, as viewed in Figure 1, that the tines 23 and 24 are in staggered or offset relationship, whereby the platform tines 23, upon being lowered, may pass between the tines of the scale platform. In this manner, it will be readily appreciated that if a stack of cheese slices or any other article is disposed upon the upper surface of the tines 23, as such tines pass downwardly between the tines 24 of the scale platform, the stack will be deposited on the latter, at which time they may be conveniently weighed. Due to the number of stack receiving platforms or grids, when one of the grids is depositing its load upon the scale platform, it will be appreciated that another one of the grids is in position for receiving slices which subsequently form the stack thereof. As viewed in Figure 1, the right hand grid 21a would be positioned subjacent the slicing delivery mechanism, and although four grids are shown in the drawings, other numbers such as two or three could be used without departing from the spirit or scope of the present invention. However, it is believed desirable at all times to have a grid positioned beneath the slicer while one of the other grids is positioned adjacent the weighing machine or scale.

Actually, the movement of the respective grids is complex rather than simple lineal movement. First of all, assuming that the grid lies in a first horizontal plane, the grid is moved horizontally, and preferably about a central vertical axis until it overlies the discharge station or scale platform. As it reaches this position, the grid is caused to descend so that the material or objects thereon will be deposited on the interleaved tines of the scale platform. Following this operation, the grids must be raised in order to again reach their first horizontal plane so that upon a complete operational cycle of the machine, the respective grids will be sequentially positioned in their proper plane adjacent the slicing mechanism. Also, it will be later described why the grids are moved upwardly through the tines of the scale rather than at a different phase of its cycle of horizontal movement.

To further clarify the general mode of operation of the instant apparatus, it will be appreciated that a conventional intermittent type of slicer is designed to deliver a predetermined number of slices and then cease the slicing operation for a predetermined time interval. It is during this time interval that the grids are horizontally indexed 90 degrees, or if fewer or a larger number of grids are utilized, to some other angular displacement, so that the grid which had been positioned adjacent the slicer moves to its stack unloading position over the scale or other discharge platform. Unfortunately, notwithstanding the high precision operation of modern slicers in many instances the delivered stack will be overweight or underweight and it is for this reason that each stack is deposited upon a scale preset for the proper weight, so as to insure proper slice thickness and/or density. Furthermore, as a slicer may cut slices at the rate of approximately 240 slices per minute, the stacks are rapidly formed, and the deposit of the stacks on the weighing machine must be in a relatively gentle manner for if the stacks were abruptly dropped onto the scale platform, which as previously mentioned is in the form of a grid having a plurality of tines, the scale pointer would oscillate for a considerable period of time before an accurate reading could be taken. By means of the present apparatus the deposit of the stack on the scale is smooth and uniform and will overcome this difficulty. Thus, as the stack is deposited on the scale, an operator positioned adjacent thereto may readily determine whether the stack meets the minimum or maximum weight requirements and if not, instead of bagging this stack, may remove the same for some other operation, or may correspondingly adjust the slicer to cut thinner or thicker slices.

The operating components of the present invention, exclusive of the exposed stack receiving and transferring grids 21, are mounted within a casing generally indicated by the numeral 31 which is preferably provided with removable side portions to provide access to the operating mechanism. Suitable frame work extending longitudinally of the machine such as indicated at 32 and 33 is likewise provided to provide a support for such mechanism, and the entire housing and frame members may be supported in spaced relationship to the ground by any suitable adjustable legs, not shown.

Although the present mechanism is designed to operate in intermittent actuations so as to be synchronized with the idling cycle of a slicer, a constant power source, such as a motor, not shown, is utilized for supplying the motivating power for the necessary actuation of the grids and other parts of the machine. The motor may be connected to a sheave 36 through a belt 37, the sheave in turn being connected to a worm 38 which drives a worm gear 39. Worm gear 39 is freely journaled on a vertically positioned drive shaft 47, the upper end of the gear being provided with a clutch element 42 having serrations or teeth 43 adapted for engagement with similar teeth 44 of an upwardly positioned clutch element 46. The upper clutch element is mounted for rotation with but is capable of axial movement on the shaft 47 and is normally urged towards engagement with the lower clutch element 42 by means of a spring 48 interposed between the upper end of the clutch 46 and the lower surface of a cam 49 whose function will be later explained. The shaft 47 is referred to as a drive shaft as it furnishes the motivating power for the rest of the apparatus and is driven upon engagement of the clutch elements. As the motor is constantly rotating, so will the lower clutch element 42 be constantly rotating about the shaft 47 by means of its connection to the motor through the worm and worm gear. However, as an intermittent rotary action is required for the shaft 47 and other portions of the mechanism driven by said shaft, the movement of the grids and therefore the clutch elements are disposed in driving relationship intermittently rather than continuously.

More specifically, such intermittent operation is arranged to be commenced upon the receiving of an impulse from a source exteriorly of the machine such as from the slicer upon the latter's delivering a full stack of slices onto one of the grids 21. Thus, the apparatus will be at a rest position or idling while the slices are being deposited upon the grid. In practice, a microswitch (not shown) is placed on the slicing machine, and the switch is actuated upon the formation and depositing of the last slice of cheese or the like in a stack. This switch is operatively connected in a conventional manner to a solenoid 51 which is thereupon energized and caused to effect inter-engagement of the clutches for driving of the upper clutch element, shaft 47, and the remaining portions of the apparatus.

Upon actuation of the solenoid, means are provided for causing the upper clutch element 46 to descend and engage the lower clutch element 42 whereby the constantly rotating latter member may drive the former. However, at the end of each revolution of the upper element, means are provided to again disengage the clutch elements, and permit the parts to remain in such disengaged or rest position until the solenoid 51 is again actuated.

The upper clutch element 46 is normally urged into driving relationship with the constantly rotating lower element through the action of the spring 48 but notwithstanding this spring pressure, or gravital force the two clutch elements are normally maintained in spaced or disengaged relationship through the action of a lug 56 extending radially from clutch element 46 and riding on an upwardly inclined cam 57. This cam is further provided with a stop 58 which engages the lug for limiting the degree of rotation of the upper clutch element to a single complete revolution. Thus, in order to permit descension of the upper clutch element and consequent engagement with the driving element 42, the cam must be moved away from its engagement with the lug and permit the combination of gravital force and spring pressure to urge the upper clutch member into its operative driving position.

The cam 57 is actuated by the solenoid 51, which, upon actuation, raises its plunger 61 to tilt the cam away from the clutch elements. As will be noted, the cam 57 is carried on the upper end of a block 62 whose lower end is journaled on a horizontal pivot pin 63. A pair of parallel arms 64 are pivotally connected to an intermediate portion of the block by means of a pin 66, and at the other end thereof to the distal end of the solenoid plunger 61 by means of a pin 67. The arms 64 are limited to a mere rocking movement by being journaled on another pin 68 which is carried by arms 69 pivoted to the frame structure as indicated at 71. Thus, as the solenoid rod 61 is retracted or moved upwardly, arms 64 will rock about the pin 68 effecting a clockwise rotation of the block 62 and its associated cam about the pin 63. This will permit the upper clutch element to descend and engage with the lower clutch element whereby the shaft 47 will be rotated. However, as the shaft starts its rotation, the solenoid will again return its plunger to its normal downward position, and cam 57 will likewise be in position to intercept the lug 56 upon the completion of a single revolution of the upper clutch element. This interception takes place by the clutch lug 56 riding upwardly on the cam until it strikes the cam stop.

In order to insure a complete revolution of the shaft, and to prevent a hammering effect when the lug 56 strikes the stop, due to the inertia of the rotating shaft, the cam 49 is utilized. As best seen in Figure 1 of the drawings, cam 49 is mounted on the shaft 47 and is provided with a generally V-shaped cam surface 76, with the apex of such surface corresponding to the rest portion of the clutch. A cam roller or follower 77 is carried on an arm 78 which is pivotally attached to the frame as indicated at 79. The other end of the arm 78 remote from said pivotal connection, is engaged by a spring 81 having one end secured to frame work 33, this spring being utilized to urge the arm 78 and consequently the roller 77 against the peripheral surface of the cam 49. As the roller approaches the V-shaped cam portion, it will be appreciated that due to the angular configuration, the roller will force the cam to continue rotating until the roller reaches the apex of the V. As hereinabove explained, this corresponds to the rest position of the clutch and the parts will therefore be in position for receiving the next solenoid impulse.

Means are provided for interconnecting drive shaft 47 and the grids 21 whereby upon a single rotation of the shaft, the grids will be rotated in a horizontal plane through an arc of 90 degrees, so that the respective grids will be sequentially positioned subjacent the slicer and an adjacent grid positioned adjacent and overlying the scale platform. As here shown, such means may assume the following construction. Carried on and rotatable with shaft 47 is a sprocket 86 engaged with a chain 87 which is operatively connected to a similar sprocket 88 carried on a vertical shaft 89 disposed in parallel spaced relationship to the main drive shaft 47. As the sprockets 86 and 88 are of the same size, each revolution of shaft 47 upon solenoid actuation will impart a similar single revolution to the shaft 89. Shaft 89 is provided with an eccentric arm 91 having a distal end which is pivotally attached to one end of a bifurcated yoke member 92 by means of a pin 93. An intermediate portion of the member 92 is pivotally attached to a pin 94, the latter being secured to a plate 96 which is carried by and is rotatable with the drive shaft 47. The bifurcated end portions 97 of the yoke member are arranged to sequentially engage a plurality of freely journaled rollers 98 which depend from a horizontally disposed disk 99. As here illustrated, six equally circumferentially spaced rollers are provided and the arrangement of the parts is such that for each revolution of shaft 47 or shaft 89, the yoke member will be brought into engagement with one of the rollers so as to move the disk 99 through one-sixth of a revolution and then release the roller in preparation for engagement with the next adjacent roller. In general, the yoke and roller arrangement above described will produce a Geneva motion to the disk 99 and to an associated shaft 101 on which the disk is carried. To prevent overrunning of the disk 99, at the end of each 60 degrees of rotation, the roller will engage a cam surface 100 on disk 96, a cut out portion of such disk designated by the numeral 105 freely passing between the rollers during each rotation of the disk.

Figure 4:
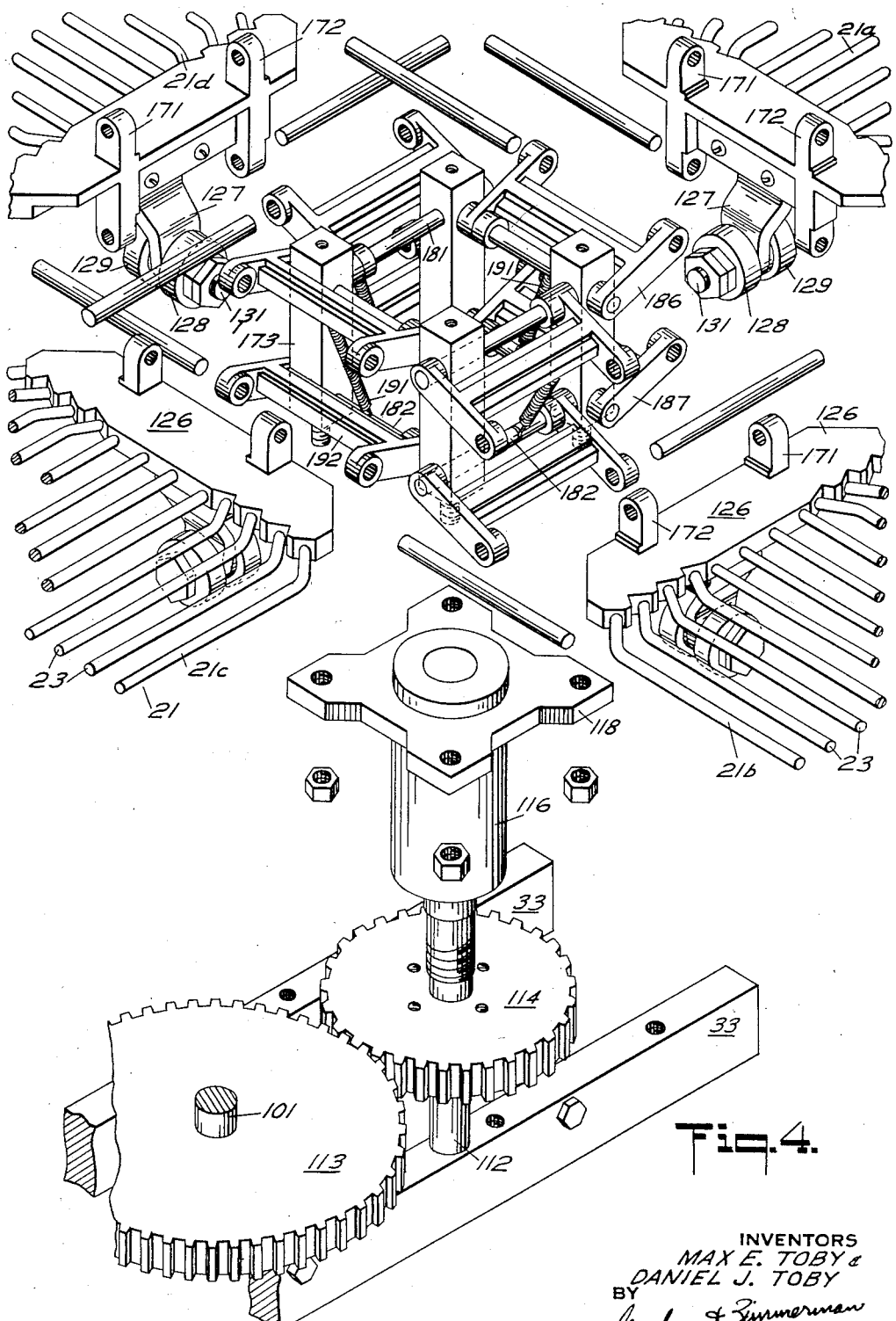
Figure 4 is an exploded perspective view of a portion of the transfer mechanism and the drive means therefor.

The grids 21 are mounted for rotation about a stationary shaft 112. Gear means are interposed so as to impart rotary movement from the shaft 101 for producing horizontal movement of the grids. With particular reference to Figure 4 of the drawings it will be noted that shaft 101 adjacent the lower end thereof is provided with a gear or sprocket 113 in meshed engagement with a sprocket 114 freely rotatable about grid shaft 112. It will also be noted that gear 113 is larger than the gear 114 so that although shaft 101 and the gear 113 is rotated through 60 degrees for each rotation of the main drive shaft 47 and shaft 89, the gear 114 and its associated collar 116 will be rotated through 90 degrees during each such drive shaft rotation. In this manner, the respective grids will be properly indexed 90 degrees during each solenoid impulse. The particular construction of the grids and their method of attachment to the collar 116 will be hereinafter described in detail, but for the present it might be explained that collar 116 which is suitably journaled on shaft 112 and is secured to gear 114 has an upper end provided with a horizontally disposed plate or shelf member 118 which is arranged to support all of the grids as will be later explained. In any event, it is believed clear that upon rotation of the gear 114 and collar 116 as hereinabove set forth, the plate 118 will be likewise rotated through 90 degrees and as the grids are carried thereon, the latter will be likewise moved through this same degree of rotation.

As hereinabove stated, the grids are arranged for vertical reciprocatory movement as well as movement in a horizontal plane so as to permit the stack of slices to be transferred from the grid tines 23 onto the tines 24 of the weighing platform. Preferably, the scale platform is at a lower level than the level at which the slices are deposited upon the receiving grids and after the grid carrying a stack of slices is indexed to a position overlying the scale platform, mechanism is provided to effect a descension of the grid through the tines of the scale platform so that the stacked slices will be deposited upon such platform. It would be possible to then further index the machine before raising the receiving platforms 21 so as to have the latter at their proper elevation upon again arriving at the slicing mechanism. However, for practical reasons, it has been found that an operator attending the machine might forget to remove a stack of slices deposited upon the scale platform and when the next succeeding stack of slices is delivered there would be an obstruction presented thereto. Accordingly, as an important feature of the present invention, the receiving platform or grids 21 are caused to ascend and pass through the scale platform before being indexed to the next horizontal station. In this manner, if a stack of slices was inadvertently left upon the scale platform, the rising grid would pick up the same and carry it around through the complete cycle of operation of the apparatus. This would result in nothing worse than upon four successive cycles that a double stack of slices would be deposited upon the scale and the presence thereof would be readily ascertained by the operator.

Broadly speaking, the cycle of operation to be performed by the mechanism of the grid raising and lowering means is substantially as follows. During the first 90 degrees of rotation of the main drive shaft 47 and auxiliary shaft 89, there is no horizontal motion imparted to the grids 21 and only the grid positioned subjacent the scale tines from the last succeeding delivery operation will be elevated to its normal horizontal position above the scale. During the next 180 degrees of rotation of shafts 47 and 89, the bifurcated yoke member 97 is caused to engage one of the rollers 98 for moving the disk 99 and through the latter's connection with the grids to move the grids through 90 degrees of horizontal movement, all as hereinabove described. The final 90 degrees of rotation of shafts 47 and 89 results in a mere downward movement of the grid 21 positioned immediately over the scale platform to a lowermost position subjacent the scale platform for transferring the stack to the latter. This completes one complete cycle of operation, and the apparatus is then in condition to be again actuated by having the slicer deposit a full load of slices onto the receiving grid and an impulse delivered to the solenoid.

Figure 5:
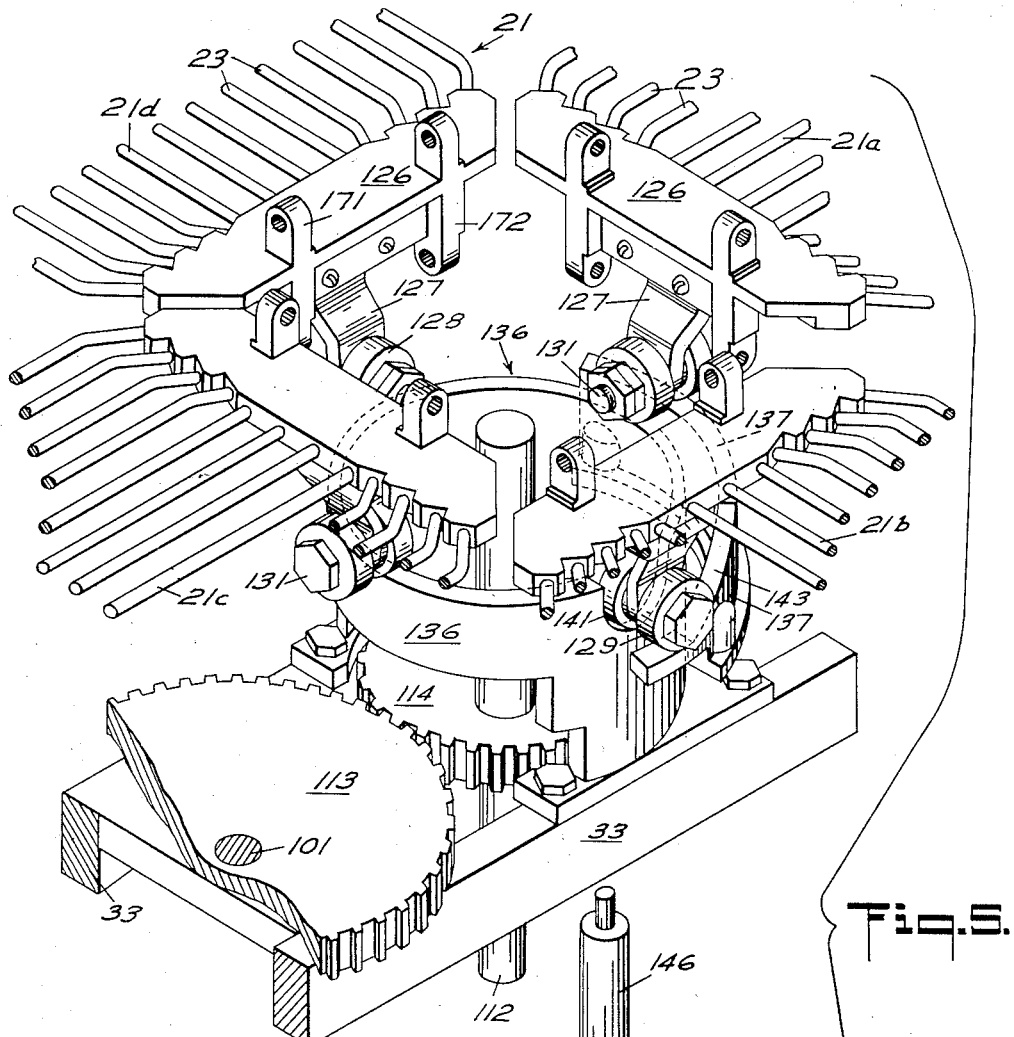
Figure 5 is another exploded perspective view showing the mechanism for raising and lowering the grids or stack supporting members.
Figure 6:
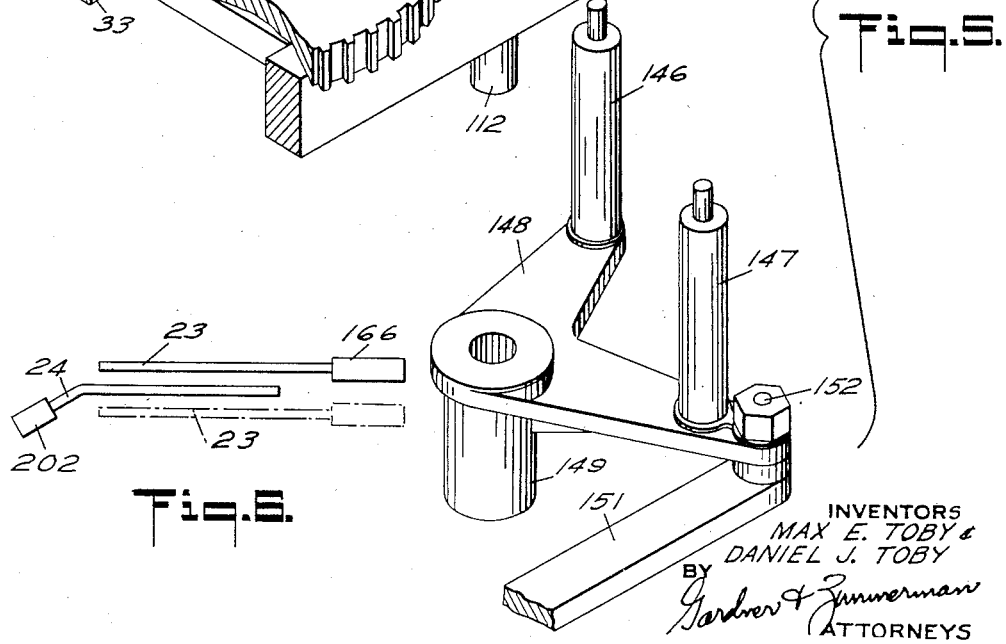
Figure 6 is a portional cross-sectional view taken substantially in the plane indicated by line 6—6 of Figure 1, illustrating the respective positions of the grids relative to the scale platform.

To accomplish the foregoing raising and lowering of the grids in the above mentioned timed relationship to the horizontal movement thereof, certain novel mechanism is provided. In order to better understand the operation thereof, some consideration should first be given to the particular construction of the receiving platforms or grids themselves. As is best seen in Figures 4 and 5 of the drawings, each grid is provided with a plurality of the tines 23 secured to a cross bar 126 extending generally transversely to the longitudinal axis of the tines. Preferably, the cross bars 126 are provided with a plurality of bores arranged to receive the respective tines in press fit relationship. Each of the bars 126 is provided with a depending bracket 127 which carries a pair of coaxial spaced rollers 128 and 129 which are journaled on the bracket by means of a pin 131 or the like. The rollers 128 and 129 are actually cam followers and are arranged to cooperate with a pair of cams designated by the numerals 136 and 137 respectively. As will be seen in the drawings, roller 128 rides on the upper surface of cam 136 which may be termed as the stationary cam, whereas roller 129 is engageable with the upper surface of cam 137 which may be termed a movable cam, the latter being rotatable about the axis of the grid moving shaft 112. Obviously, during a substantial portion of operation of the grids, they are maintained in their elevated position and it is only at the start and stop of each cycle of operation that there is any vertical movement imparted to the grids, and in such event, such movement is only imparted to the grid positioned adjacent the scale platform.

The stationary cam 136 has a substantially continuous upper horizontal surface whereby the grids are maintained in their elevated position. However, at a point on the cam corresponding to the position of the scale platform there is a U-shaped depression 141 provided in the cam which permits the roller 128 to descend in a manner now to be discussed. The movable cam 137 is preferably constructed as a segment of approximately of 90 degrees of arc and has an upper surface provided with a downwardly directed cam portion 143 terminating in a flat lower portion 144. As cam 137 is moved past one of the rollers 129, it will be appreciated that such roller may follow the cam surfaces 143 and 144 to cause either a raising of the roller and its corresponding grid or a descension of the same, depending upon the sense of rotation of the cam.

Means are provided during the start and stoppage of an operational cycle to move the cam 137 for the above mentioned purposes. As here illustrated, the lower portion of cam 137 is provided with apertures to receive a pair of posts 146 and 147. These posts are carried at the distal ends of a bell crank 148 whose medial portion is mounted on a sleeve 149 freely journaled on the grid shaft 112. Actuation of the bell crank, i. e., oscillation about grid shaft 112, and consequently reciprocating movement of the cam 137 is effected through a link 151 having one end thereof pivotally attached to the bell crank as indicated at 152 and at its other end being pivotally attached to a link 153 by means of a pivot pin 154. Link 153 is pivoted at the end remote from pivot connection 154 to a stationary portion of the frame by a pin 156 and an intermediate portion of link 153 is provided with a cam follower or roller 158. The follower is in engagement with a cam 161 carried on shaft 89 which is provided with a substantially 180 degree arcuate portion 162, which does not operate to create any motion to the links, and a pair of lobes designated by the numerals 163 and 164 respectively. The depression 166 between the lobes constitutes the position of the cam follower 158 at the end of an operational cycle. At the commencement of a new cycle, the follower will rise up on the lobe 163 which extends for approximately 90 degrees of the rotation of the single rotation of a single cycle and causes the grid which is positioned subjacent the scale platform to rise through the action of cam 137 being moved in a clockwise direction as viewed in Figure 5 which urges the cam follower 129 upwardly. During the time that the follower 158 is on the cam portion 162, there is no vertical movement imparted to the grids and the only actual operation of the mechanism occurs in the indexing of the grids through the 90 degrees of arc. During the time that the follower 158 rides on the cam portion 162, the horizontal indexing is affected as above described. By the time the follower 158 reaches the other lobe 164, the above mentioned indexing has been completed, and the cam 137 through its above discussed linkage arrangement is caused to move in an opposite direction causing a descension or lowering of the grid adjacent the weighing platform to a position subjacent the latter. When this occurs the operational cycle has been completed and the stack of slices transferred from the grid onto the scale platform. The mechanism is then in position for receiving another impulse from the slicer so that the solenoid may be actuated and another operational cycle commenced.

Means are provided for supporting the grids in a horizontal plane during the aforementioned raising and lowering thereof. Again referring to Figures 4 and 5 of the drawings it will be seen that each of the grid cross bars 126 are provided with a pair of spaced ears 171 and 172, such ears extending above and below the general plane of the cross bars. Carried on the plate 118, which is mounted for rotation about the grid shaft 112, are a plurality of posts 173 which are secured to the plate such as by providing threaded studs extending from the lower ends of the posts engageable in suitable apertures through the plate. Carried between each adjacent pairs of posts 173 on pivot pins 181 and 182 respectively are two pairs of vertically spaced links 186 and 187, each of such pairs being pivotally connected at one end thereof to the posts. The other ends of each of the pairs of links 186 and 187 are connected by means of suitable pins to the upper and lower portions of the grid ears 171 and 172. A spring 191 is positioned between pin 182 and a cross bar 192 on the upper pair of links 186 resulting in a movement of the links to a position wherein the grids and the rollers carried thereby are urged into engagement with the respective cams. Thus, it will be appreciated that as the grids are caused to descend through action of the cam 137 and spring 191 when the grid overlies the scale platform, the links 186 and 187 will pivot about their respective posts, and likewise upon upward movement of the grids at the commencement of a new cycle of operation, the links will be pivoted upwardly and maintain the moving grid in proper oriented relationship.

From the foregoing description both the method of operation and the details of construction of the present apparatus should be understood. It will be readily appreciated that the apparatus is entirely automatic and requires no attention from an operator other than to remove the stack of slices which has been deposited upon the scale platform. It will also be appreciated that there is no possibility of any interference with the mechanism through human error for even if the operator left a stack of slices on the scale platform, no jamming or other difficulties could occur as such stack would merely be removed from the scale and carried completely around the machine on one of the receiving platforms or grids. The apparatus is designed to operate with even the most rapid intermittent slicing machines and is capable of long periods of use without maintenance or other difficulties.

Although the scale itself does not constitute any independent part of this invention, it will be noted that the tines of the scale platform are carried on a cross bar 202 positioned remotely from the cross bars 126 of the grids so as to permit free interleaving of their respective tines. The platform is counterbalanced by weights or the like which may be placed on a platform 203, with a vertically extending scale tower 204 carrying the pointer or other indicator. Obviously, if no weighing was required, the tines 24 could merely comprise a stationary discharge platform for receiving the successive articles from the delivery grids. Also, it will be seen that the scale tines 24 lie in a horizontal plane above the level of the cross-bar 202 whereby the slices may be readily removed by the operator without obstruction from such bar.

What is claimed is:

1. Article handling apparatus comprising: a plurality of substantially rigid horizontally disposed article-supporting members each having an upper surface on which an article may be supported, means for successively moving each of said members along a horizontal path from a first receiving position to a second position, a platform underlying said second discharge position, said platform having a plurality of horizontally spaced support elements thereon, each of said members having a plurality of similar support elements thereon and disposed in vertical planes intermediate said discharge support elements when said member overlies said platform, and means for lowering said supporting member elements through said platform elements upon stoppage of horizontal movement of said members.

2. Apparatus as set forth in claim 1 including means for raising said article supporting member back through said support members before the next successive horizontal movement thereof.

3. Apparatus for conveying articles from a dispenser to a horizontally remote and vertically offset scale having a plurality of fingers providing a weighing platform comprising: a plurality of support members on which said articles may be deposited from the dispenser all lying substantially in a horizontal plane, each of said members having horizontally spaced fingers, means for indexing sequential ones of said members for a prescribed number of degrees of rotation about a substantially vertical axis from said dispenser to said scale and with the fingers of said platform and support members in interleaving relation, and means for lowering sequential ones of said members as such member overlies said scale platform whereby an article supported thereon may be transferred from said support member to said platform.

4. Apparatus of the character described for use with an article dispenser and a receiving platform having a plurality of spaced horizontal fingers comprising: a plurality of equally circumferentially spaced horizontally disposed article-supporting members, each of said members having a plurality of longitudinally extending horizontally spaced fingers thereon disposed generally radially from a common substantially vertical axis, means for intermittently rotating said members about said axis in a substantially horizontal plane, and means for lowering successive ones of said members through the fingers of said receiving platform upon stoppage of movement in said horizontal plane.

5. Apparatus as set forth in claim 4, including a common support member rotatable with and adapted to support each of said members, and a cam having an inclined surface thereon, a roller carried by each of said members and engageable with said inclined surface, and means for moving said cam about said vertical axis so as to successively lower and raise said members.

6. Article transfer mechanism adapted for use with an article dispenser and a scale having a scale platform provided with a plurality of spaced horizontally disposed fingers on which an article may be supported for weighing, comprising: a plurality of article-support members having a plurality of spaced fingers thereon lying in a substantially horizontal plane, each of said support members being equally circumferentially spaced about a common vertical axis, means for intermittently rotating said support members through a number of degrees corresponding to the angular relationship between adjacent members, means for halting rotation of said members when one of said members overlies said scale platform with the respective fingers on the member and platform in interleaving relationship, and means for lowering said support member fingers through the fingers on said scale platform whereby an article carried by the fingers of the support member will be deposited on the fingers on the scale platform.

7. Apparatus as set forth in claim 6 in which means are provided for raising said support member fingers up through said scale fingers prior to horizontal movement of said members.

8. Article transfer mechanism comprising: an article delivery station and an article discharge station having a plurality of spaced horizontal fingers, a plurality of article-supporting members having a plurality of spaced fingers thereon lying in a substantially horizontal plane, a constantly driven element, a shaft, clutch means interposed between said element and said shaft and adapted to impart a single rotation to said shaft upon engagement of said clutch, means interconnecting said members and said shaft whereby said members will be rotated upon engagement of said clutch to position one of said members at said delivery station and another of said members at said discharge station, and cam means engageable by said members to successively lower and raise one of said members at said discharge station and through the fingers thereat upon stoppage of horizontal movement thereof.

References Cited in the file of this patent

UNITED STATES PATENTS

| | | |
|---|---|---|
| 2,061,358 | Hunter et al. | Nov. 17, 1936 |
| 2,124,678 | Talbot | July 26, 1938 |
| 2,153,071 | Bishop | Apr. 4, 1939 |
| 2,274,842 | McCann | Mar. 3, 1942 |
| 2,485,943 | Turrall | Oct. 25, 1949 |
| 2,695,432 | Young | Nov. 30, 1954 |